(12) United States Patent
Kim et al.

(10) Patent No.: US 12,730,329 B2
(45) Date of Patent: Sep. 8, 2026

(54) DEVICE FOR GENERATING AND SPLITTING POLARIZED LIGHT

(71) Applicant: Electronics and Telecommunications Research Institute, Daejeon (KR)

(72) Inventors: Kap Joong Kim, Daejeon (KR); Chun Ju Youn, Daejeon (KR); Young-Ho Ko, Daejeon (KR); Minchul Kim, Daejeon (KR); Seong Su Park, Daejeon (KR); Kyongchun Lim, Daejeon (KR); Byung-seok Choi, Daejeon (KR); Joong-Seon Choe, Daejeon (KR); Won Seok Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 295 days.

(21) Appl. No.: 18/516,066

(22) Filed: Nov. 21, 2023

(65) Prior Publication Data

US 2024/0168307 A1 May 23, 2024

(30) Foreign Application Priority Data

Nov. 21, 2022 (KR) ........................ 10-2022-0156546
Nov. 21, 2023 (KR) ........................ 10-2023-0161771

(51) Int. Cl.
*G02B 27/28* (2006.01)

(52) U.S. Cl.
CPC ......... *G02B 27/283* (2013.01); *G02B 27/286* (2013.01)

(58) Field of Classification Search
CPC .................................................. G02B 27/283
See application file for complete search history.

(56) References Cited

U.S. PATENT DOCUMENTS 9,819,420 B2 11/2017 Wen et al.
10,101,532 B1 10/2018 Lin
(Continued)

FOREIGN PATENT DOCUMENTS

KR 10-2019-0062006 A 6/2019
KR 10-1985926 B1 9/2019

OTHER PUBLICATIONS

Wesley D. Sacher, et al., "Polarization rotator-splitters and controllers in a Si3N4-on-SOI integrated photonics platform", Optics Express, pp. 11167-11174, May 5, 2014, vol. 22, No. 9.
(Continued)

*Primary Examiner* — Edmond C Lau
(74) *Attorney, Agent, or Firm* — Sughrue Mion, PLLC

(57) ABSTRACT

Disclosed is a polarized light generating device based on an optical waveguide, which includes first to fourth input optical waveguides, respectively, for receiving input light from an outside, first to fifth optical splitters configured to receive at least one light and output the received at least one light as at least one light, and an optical converter configured to receive at least one light from the fifth optical splitter and convert the received light to generate polarized light. The polarized light generating device receives the input light through one of the first to fourth input optical waveguides, and generates a first polarized light, a second polarized light, a third polarized light, and a fourth polarized light. The first to fourth polarized lights belong to elements of two arbitrary two-dimensional mutually unbiased basis sets.

17 Claims, 10 Drawing Sheets

(56) References Cited

U.S. PATENT DOCUMENTS

| | | | | |
|---|---|---|---|---|
| 2019/0162986 | A1 | 5/2019 | Choe et al. | |
| 2019/0353918 | A1* | 11/2019 | Kim | G02B 27/283 |

OTHER PUBLICATIONS

Zhechao Wang, et al., "Ultrasmall Si-nanowire-based polarization rotator", Journal of the Optical Society of America, May 2008, pp. 747-753, vol. 25, No. 5.

* cited by examiner

Figure 2:
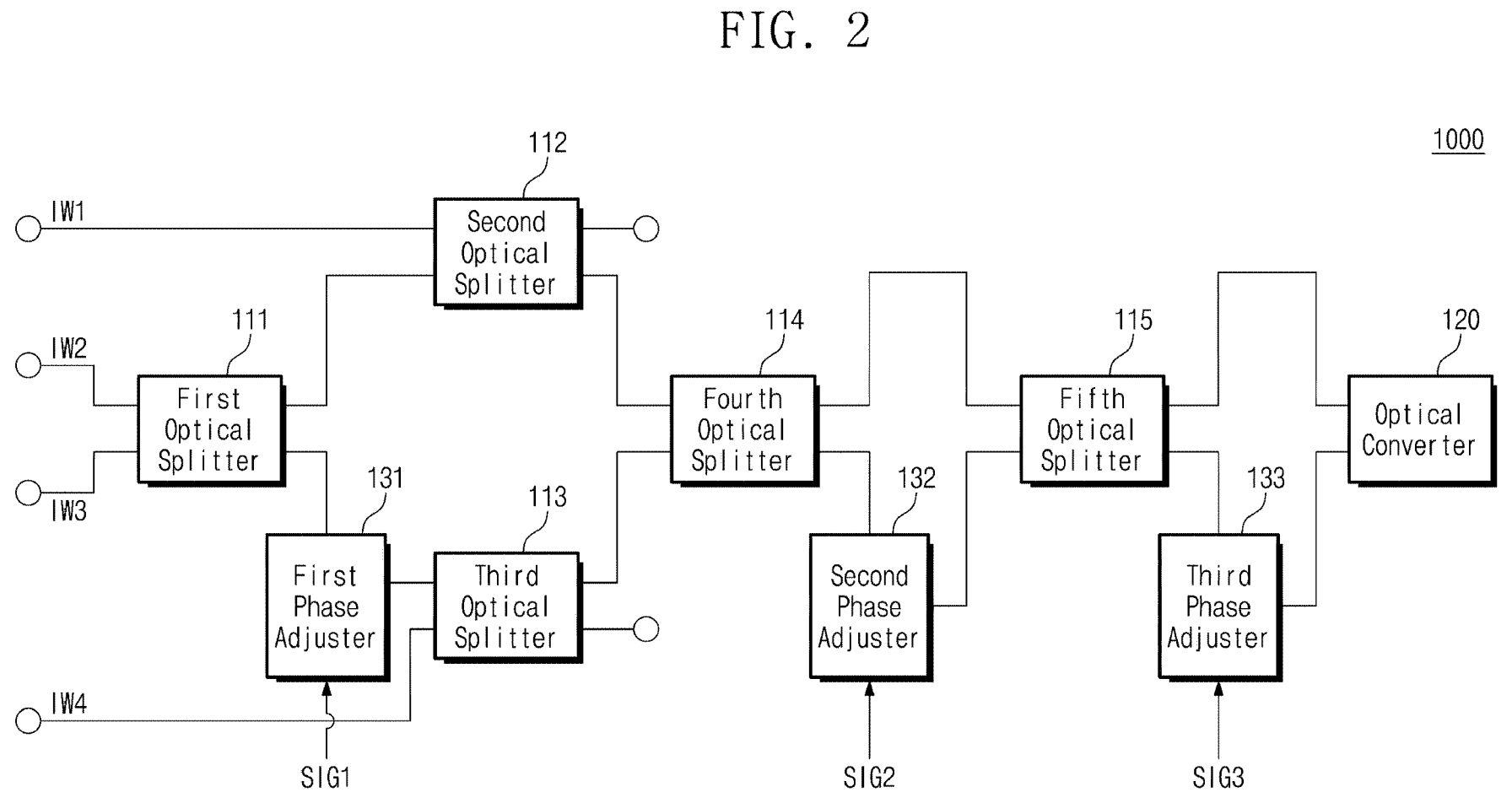

111 First Optical Splitter
112 Second Optical Splitter
113 Third Optical Splitter
114 Fourth Optical Splitter
115 Fifth Optical Splitter
120 Optical Converter
131 First Phase Adjuster
132 Second Phase Adjuster
133 Third Phase Adjuster

SIG1
SIG2
SIG3

1000
Optical Converter
120
W7
W8
Third Phase Adjuster
133
SIG3
Fifth Optical Splitter
115
W5
W6
Second Phase Adjuster
132
SIG2
Fourth Optical Splitter
114
W3
W4
Second Optical Splitter
112
Third Optical Splitter
113
W2
W1
First Phase Adjuster
131
SIG1
First Optical Splitter
111
IW1
IW2
IW3
IW4

Figure 5B:
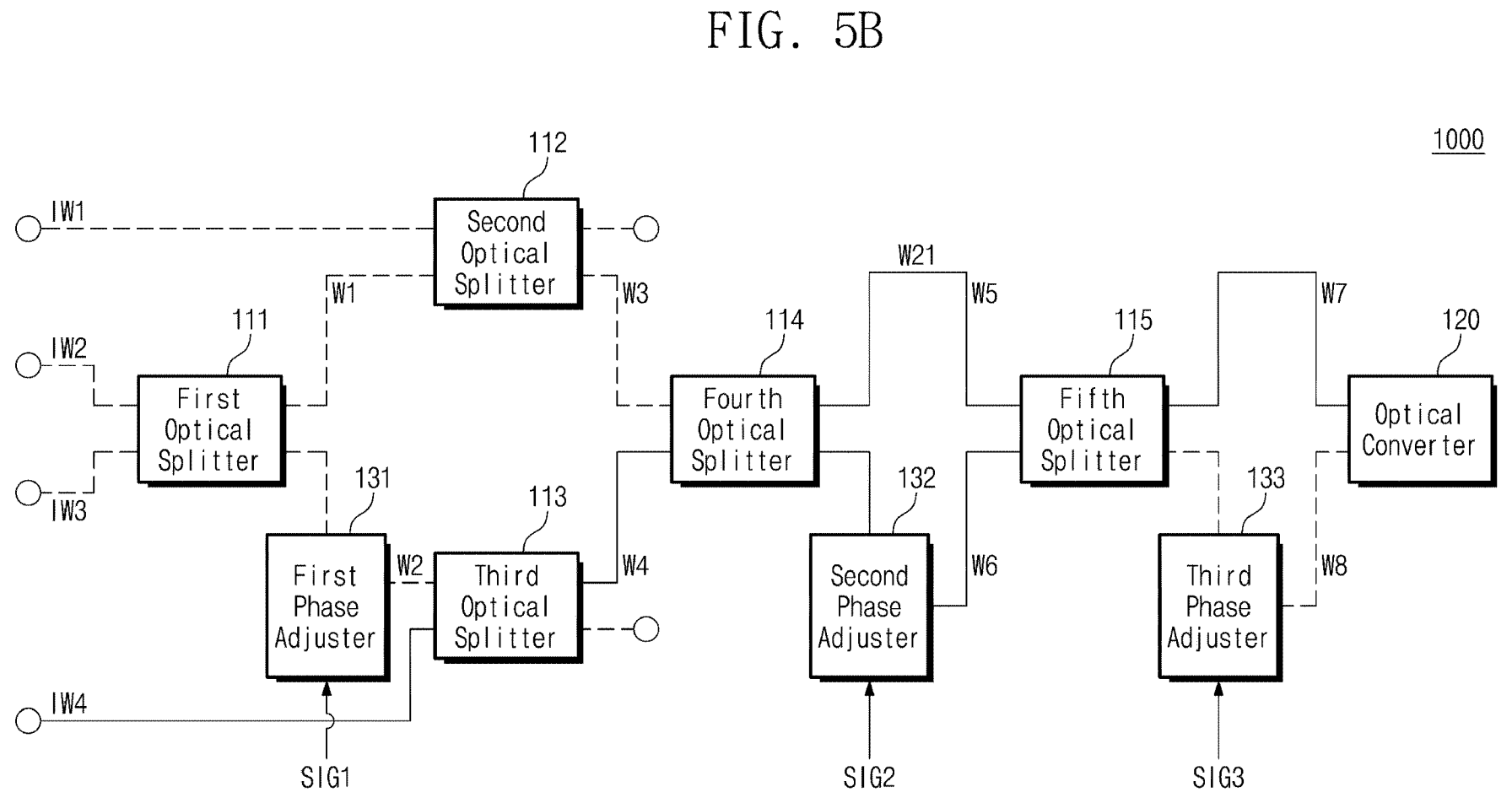

120 Optical Converter

W7

W8

133 Third Phase Adjuster

SIG3

115 Fifth Optical Splitter

W5

W6

W21

132 Second Phase Adjuster

SIG2

114 Fourth Optical Splitter

W3

W4

112 Second Optical Splitter

113 Third Optical Splitter

W2

W1

131 First Phase Adjuster

SIG1

111 First Optical Splitter

IW1
IW2
IW3
IW4
111 First Optical Splitter
112 Second Optical Splitter
113 Third Optical Splitter
114 Fourth Optical Splitter
115 Fifth Optical Splitter
120 Optical Converter
131 First Phase Adjuster
132 Second Phase Adjuster
133 Third Phase Adjuster
SIG1
SIG2
SIG3
W1
W2
W3
W4
W5
W6
W7
W8

Figure 5D:
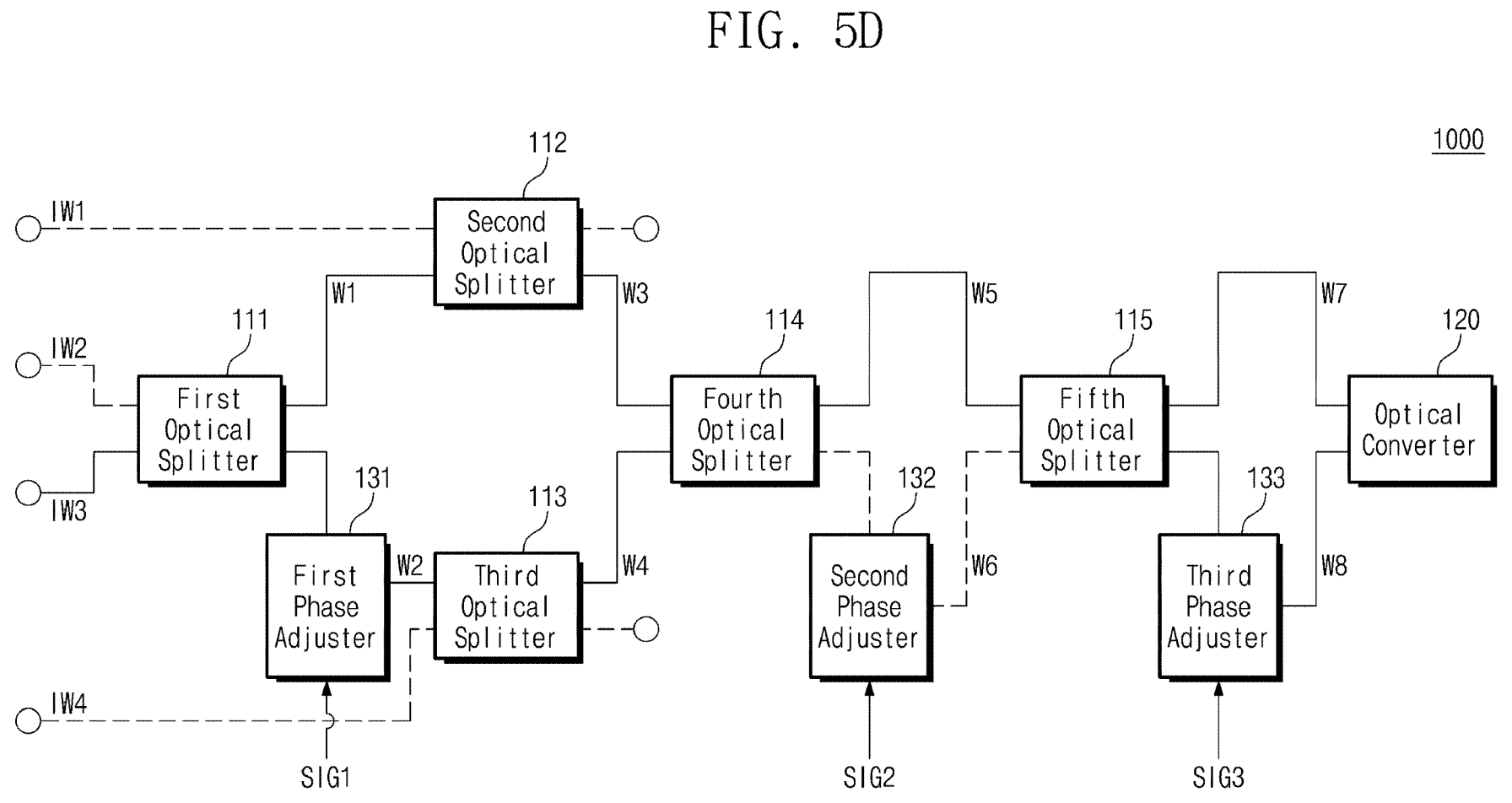

120 Optical Converter

W7 W8

133 Third Phase Adjuster SIG3

115 Fifth Optical Splitter

W5 W6

132 Second Phase Adjuster SIG2

114 Fourth Optical Splitter

W3 W4

112 Second Optical Splitter

113 Third Optical Splitter

W2

131 First Phase Adjuster SIG1

W1

111 First Optical Splitter

Figure 7:
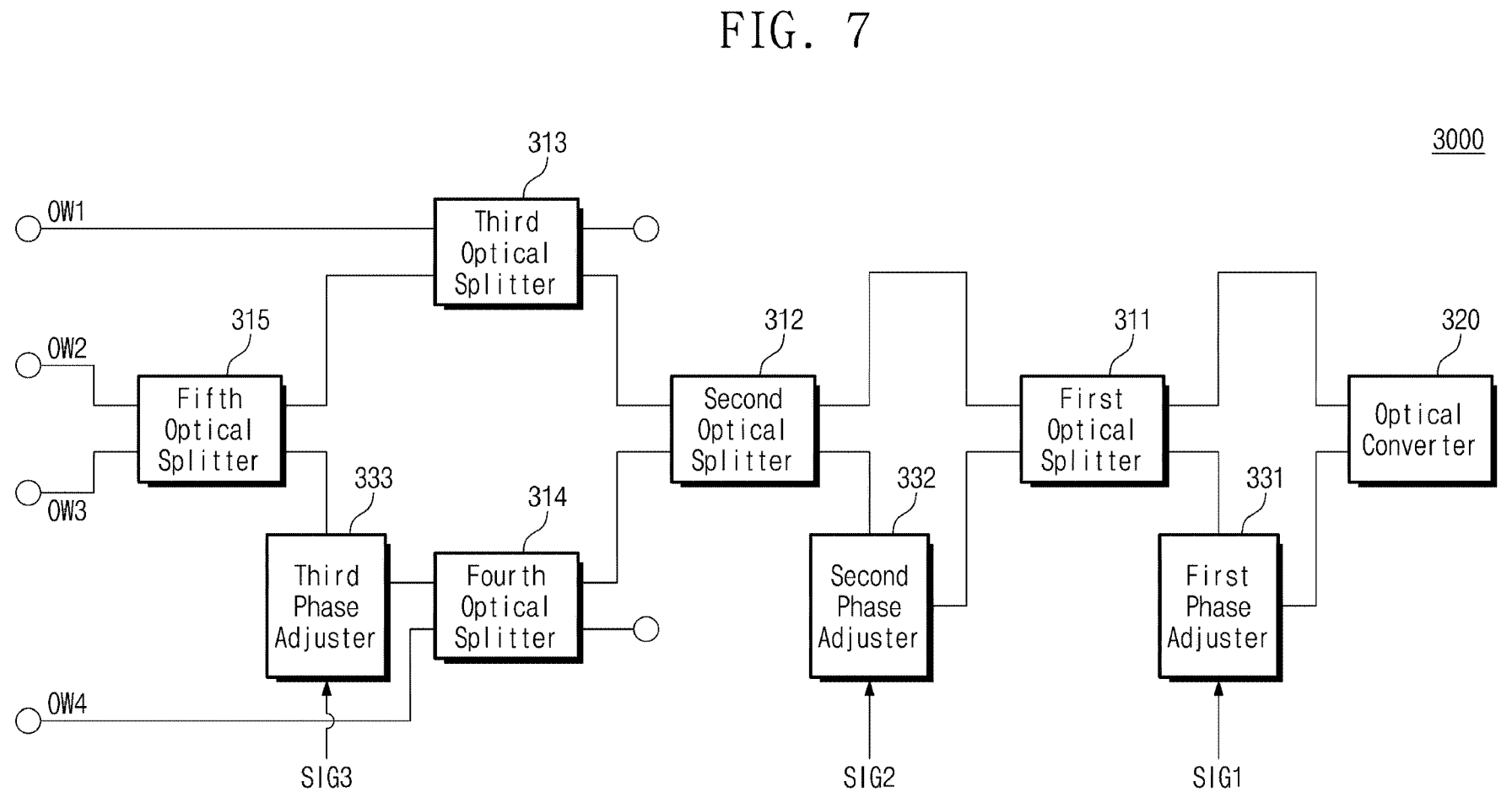

320 Optical Converter

331 First Phase Adjuster

SIG1

311 First Optical Splitter

332 Second Phase Adjuster

SIG2

312 Second Optical Splitter

313 Third Optical Splitter

314 Fourth Optical Splitter

333 Third Phase Adjuster

SIG3

315 Fifth Optical Splitter

OW1

OW2

OW3

OW4

DEVICE FOR GENERATING AND SPLITTING POLARIZED LIGHT

CROSS-REFERENCE TO RELATED APPLICATIONS

This application claims priority under 35 U.S.C. § 119 to Korean Patent Application No. 10-2022-0156546 filed on Nov. 21, 2022, and Korean Patent Application No. 10-2023-0161771 filed on Nov. 21, 2023, in the Korean Intellectual Property Office, the disclosures of which are incorporated by reference herein in their entireties.

BACKGROUND

Embodiments of the present disclosure described herein relate to a device for generating and splitting a polarized light, and more particularly, relate to a device for generating or splitting a plurality of polarized lights from at least one light.

In the field of optical communications, a polarized light is used as a means of transferring information. Since the polarized light may include information, the information transmission capacity increases as the number of polarized lights used increases.

In addition, the polarized light is used to split encryption keys in the field of quantum cryptography communications. For example, in the field of quantum cryptography communications, a polarization generator is used for encoding and a polarization splitter is used for decoding.

In the fields of optical communications and quantum cryptography communications, technologies related to miniaturization and integration of devices are being developed. In the field of quantum cryptography communications, the development of mass production and commercialization technologies for polarization generators and polarization splitters is required.

SUMMARY

Embodiments of the present disclosure provide a polarized light generating device and a polarized light splitting device based on an optical waveguide.

According to an embodiment of the present disclosure, a polarized light generating device based on an optical waveguide includes first to fourth input optical waveguides, respectively, for receiving input light from an outside, first to fifth optical splitters configured to receive at least one light and output the received at least one light as at least one light, and an optical converter configured to receive at least one light from the fifth optical splitter and convert the received light to generate polarized light. The polarized light generating device receives the input light through one of the first to fourth input optical waveguides, when the input light is received through the first input optical waveguide, generates a first polarized light, when the input light is received through the second input optical waveguide, generates a second polarized light, when the input light is received through the third input optical waveguide, generates a third polarized light, and when the input light is received through the fourth input optical waveguide, generates a fourth polarized light. The first to fourth polarized lights belong to elements of two arbitrary two-dimensional mutually unbiased basis sets.

According to an embodiment of the present disclosure, a polarized light splitting device based on an optical waveguide includes an optical converter configured to receive a polarized light from an outside and convert the polarized light to output at least one light, first to fifth optical splitters configured to receive at least one light and output the received at least one light as at least one light, and first to fourth output optical waveguides for outputting output light, respectively. The polarized light splitting device outputs the at least one output light through at least one of the first to fourth output optical waveguides, and the polarized light belong to elements of two arbitrary two-dimensional mutually unbiased basis sets.

BRIEF DESCRIPTION OF THE FIGURES

The above and other objects and features of the present disclosure will become apparent by describing in detail embodiments thereof with reference to the accompanying drawings.

FIG. 2 illustrates a polarized light generating device according to an embodiment of the present disclosure.

FIGS. 5A to 5D illustrate operations of a polarized light generating device of FIG. 2 as an example.

FIG. 7 illustrates a polarized light splitting device according to an embodiment of the present disclosure.

DETAILED DESCRIPTION

Hereinafter, embodiments of the present disclosure will be described in detail and clearly to such an extent that an ordinary one in the art easily implements the present disclosure.

Figure 1:
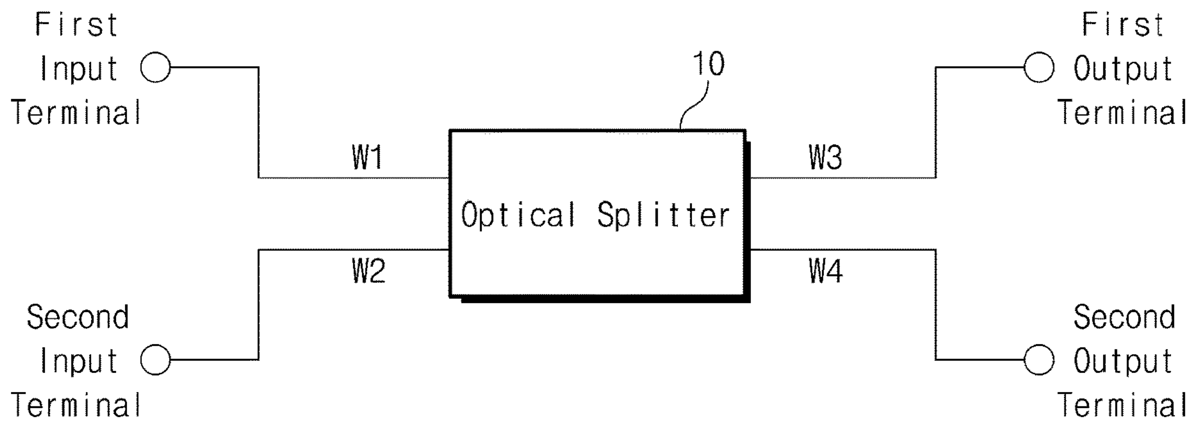
FIG. 1 illustrates an optical splitter according to an embodiment of the present disclosure.

FIG. 1 illustrates an optical splitter 10 according to an embodiment of the present disclosure. Referring to FIG. 1, the optical splitter 10 may receive at least one light from a first input terminal and a second input terminal. The optical splitter 10 may change the intensity or phase of light and may output (or split) at least one obtained light to at least one of a first output terminal and a second output terminal. The optical splitter 10 may be a 2*2 optical splitter.

For example, the optical splitter 10 may receive light from the first input terminal through a first optical waveguide W1. The optical splitter 10 may change the intensity or phase of the received light and may output the obtained light to the first output terminal and the second output terminal. The light output from the first output terminal may travel through a third optical waveguide W3, and the light output from the second output terminal may travel through a fourth optical waveguide W4. In this case, the lights traveling through the third optical waveguide W3 and the fourth optical waveguide W4 may have the same intensity and a phase difference of 90 degrees.

For example, the optical splitter 10 may receive light from the second input terminal through a second optical waveguide W2. The optical splitter 10 may change the intensity or phase of the received light and may output the obtained light to the first output terminal and the second output terminal. The light output from the first output terminal may travel through the third optical waveguide W3, and the light output from the second output terminal may travel through the fourth optical waveguide W4. In this case, the lights traveling through the third optical waveguide W3 and the fourth optical waveguide W4 may have the same intensity and a phase difference of −90 degrees.

The optical splitter 10 may receive the light from the first input terminal through the first optical waveguide W1 and may simultaneously receive the light from the second input terminal through the second optical waveguide W2. In this case, when the intensity of the received lights is the same, the optical splitter 10 may output the received lights to at least one output terminal based on the phase difference of the received lights.

For example, when the optical splitter 10 receives two lights with the same intensity and a phase difference of 0 degrees, the optical splitter 10 may output the two received lights to the first output terminal and the second output terminal. The light output from the first output terminal may travel through the third optical waveguide W3, and the light output from the second output terminal may travel through the fourth optical waveguide W4. The lights traveling through the third optical waveguide W3 and the fourth optical waveguide W4 may have the same intensity. In this case, when the phase difference between the two received lights increases from 0 degrees to 90 degrees, the intensity of the light traveling through the third optical waveguide W3 may decrease, and the intensity of the light traveling through the fourth optical waveguide W4 may increase as much as the intensity of light traveling through the third optical waveguide W3 decreases.

For example, when the optical splitter 10 receives two lights having the same intensity and a phase difference of 90 degrees, the optical splitter 10 may output the two received lights to the second output terminal. The light output from the second output terminal may travel through the fourth optical waveguide W4. In this case, when the phase difference between the two received lights increases from 90 degrees to 180 degrees, the optical splitter 10 may output the two received lights not only through the second output terminal but also through the first output terminal. The light output from the first output terminal may travel through the third optical waveguide W3. In this case, when the phase difference between the two received lights increases from 90 degrees to 180 degrees, the intensity of the light traveling through the fourth optical waveguide W4 may decrease, and the intensity of the light traveling through the third optical waveguide W3 may increase as much as the intensity of light traveling through the fourth optical waveguide W4 decreases.

For example, when the optical splitter 10 receives two lights with the same intensity and a phase difference of 180 degrees, the optical splitter 10 may output the two received lights to the first output terminal and the second output terminal. The light output from the first output terminal may travel through the third optical waveguide W3, and the light output from the second output terminal may travel through the fourth optical waveguide W4. The lights traveling through the third optical waveguide W3 and the fourth optical waveguide W4 may have the same intensity. In this case, when the phase difference between the two received lights increases from 180 degrees to 270 degrees, the intensity of the light traveling through the third optical waveguide W3 may increase, and the intensity of the light traveling through the fourth optical waveguide W4 may decrease as the intensity of the light traveling through the third optical waveguide increases.

For example, when the optical splitter 10 receives two lights having the same intensity and a phase difference of 270 degrees, the optical splitter 10 may output the two received lights to the first output terminal. The light output from the first output terminal may travel through the third optical waveguide W3. In this case, when the phase difference between the two received lights increases from 270 degrees to 360 degrees, the optical splitter 10 may output the two received lights not only through the first output terminal but also through the second output terminal. The light output from the second output terminal may travel through the fourth optical waveguide W4. In this case, when the phase difference between the two received lights increases from 270 degrees to 360 degrees, the intensity of the light traveling through the third optical waveguide W3 may decrease, and the intensity of the light traveling through the fourth optical waveguide W4 may increase as much as the intensity of light traveling through the third optical waveguide W3 decreases.

In some embodiments, the optical splitter 10 may refer to an optical element that may propagate incident light through a plurality of paths. Alternatively, the optical splitter 10 may refer to a waveguide itself (e.g., a Y-shaped waveguide) that may split and propagate one light into a plurality of paths.

FIG. 2 illustrates a polarized light generating device 1000 according to an embodiment of the present disclosure. Referring to FIG. 2, the polarized light generating device 1000 may include first to fourth input optical waveguides IW1 to IW4, first to fifth optical splitters 111 to 115, an optical converter 120, and first to third phase adjusters 131 to 133. The first to fifth optical splitters 111 to 115, the optical converter 120, and the first to third phase adjusters 131 to 133 may be connected to each other through optical waveguides.

The polarized light generating device 1000 may include the first to fourth input optical waveguides IW1 to IW4. The polarized light generating device 1000 may receive input light through one of the first to fourth input optical waveguides IW1 to IW4. In this case, the input light input to each of the first to fourth input optical waveguides IW1 to IW4 may have the same polarized light. The polarized light generating device 1000 may generate polarized light from received input light and may output a generated polarized light through the optical converter 120.

For example, when input light is received through the first input optical waveguide IW1, the polarized light generating device 1000 may generate first polarized light and may output the generated first polarized light through the optical converter 120. When the input light is received through the second input optical waveguide IW2, the polarized light generating device 1000 may generate second polarized light and may output the generated second polarized light through the optical converter 120. When the input light is received through the third input optical waveguide IW3, the polarized light generating device 1000 may generate third polarized light and may output the generated third polarized light through the optical converter 120. When the input light is received through the fourth input optical waveguide IW4, the polarized light generating device 1000 may generate fourth polarized light and may output the generated fourth polarized light through the optical converter 120.

The polarized light generating device 1000 may generate polarized lights belonging to elements of two arbitrary two-dimensional mutually unbiased basis sets. For example, when the polarized light generating device 1000 generates first to fourth polarized lights, the first to fourth polarized lights may be four different points located at equal intervals on a circle that is the intersection of a Poincare sphere representing a polarization state and a plane passing through the origin of the Poincare sphere. In this case, the first polarized light and the fourth polarized light may be perpendicular to each other, and the second polarized light and the third polarized light may be perpendicular to each other.

The polarized light generating device 1000 may include the first to fifth optical splitters 111 to 115. The first to fifth optical splitters 111 to 115 may be the optical splitter 10 of FIG. 1, but are not limited thereto.

Each of the first to fifth optical splitters 111 to 115 may receive at least one light and may output the at least one received light through at least one optical waveguide.

For example, the first optical splitter 111 may receive the input light through one of the second input optical waveguide IW2 and the third input optical waveguide IW3, and may output the received input light through at least one of two different optical waveguides. The second optical splitter 112 may receive the light through at least one of the first input optical waveguide IW1 and the optical waveguide connected to the first optical splitter 111, and may output the received light through at least one of the two different optical waveguides. The third optical splitter 113 may receive the light through at least one of the fourth input optical waveguide IW4 and the optical waveguide connected to the first phase adjuster 131, and may output the received light through at least one of two different optical waveguides. The fourth optical splitter 114 may receive the light through at least one of the optical waveguide connected to the second optical splitter 112 and the optical waveguide connected to the third optical splitter 113, and may output the received light through at least one of two different optical waveguides. The fifth optical splitter 115 may receive the light through at least one of the optical waveguide connected to the fourth splitter 114 and the optical waveguide connected to the second phase adjuster 132, and may output the received light through at least one of two different optical waveguides.

The polarized light generating device 1000 may include the optical converter 120. The optical converter 120 may receive the light through at least one optical waveguide and may convert the received light to generate the polarized light. The optical converter 120 may output the generated polarized light through the optical converter 120. The polarized light generated from the optical converter 120 may belong to elements of two arbitrary two-dimensional mutually unbiased basis sets.

The polarized light generating device 1000 may include the first to third phase adjusters 131 to 133. The first phase adjuster 131 may be connected to the first optical splitter 111 and the third optical splitter 113 through an optical waveguide, the second phase adjuster 132 may be connected to the fourth optical splitter 114 and the fifth optical splitter 115 through an optical waveguide, and the third phase adjuster 133 may be connected to the fifth optical splitter 115 and the optical converter 120 through an optical waveguide. The first phase adjuster 131 may adjust the phase of light output from the first optical splitter 111 based on a first control signal SIG1 received from the outside. The second phase adjuster 132 may adjust the phase of light output from the fourth optical splitter 114 based on a second control signal SIG2 received from the outside. The third phase adjuster 133 may adjust the phase of light output from the fifth optical splitter 115 based on a third control signal SIG3 received from the outside.

The first to third phase adjusters 131 to 133 may adjust the phase of light such that the polarized light generated from the polarized light generating device 1000 belongs to elements of two arbitrary two-dimensional mutually unbiased basis sets.

For example, when the polarized light generating device 1000 generates the first polarized light from the input light received through the first input optical waveguide IW1, generates the second polarized light from the input light received through the second input optical waveguide IW2, generates the third polarized light from the input light received through the third input optical waveguide IW3, and generates the fourth polarized light from the input light received through the fourth input optical waveguide IW4, the second phase adjuster 132 and the third phase adjuster 133 may adjust the phase of light, respectively, such that the first polarized light and the fourth polarized light are perpendicular to each other and the second polarized light and the third polarized light are perpendicular to each other. The first polarized light and the fourth polarized light may be perpendicular to each other regardless of phase adjustment of the first phase adjuster 131, and the second polarized light and the third polarized light may be perpendicular to each other regardless of phase adjustment of the first phase adjuster 131. In this case, when the first phase adjuster 131 adjusts the phase of light, the second polarized light and the third polarized light may rotate along a circle formed by a bisector point of the minimum length line segment connecting the points corresponding to the first polarized light and the third polarized light in the Poincare sphere representing a polarization state. As a result of rotation of the second polarized light and the third polarized light, the first to fourth polarized lights may belong to the elements of two arbitrary two-dimensional mutually unbiased basis sets.

As described above, the polarized light generating device 1000 may receive the input light through each of the first to fourth input optical waveguides IW1 to IW4, and may generate the first to fourth polarized lights belonging to elements of two arbitrary two-dimensional mutually unbiased basis sets. For example, the polarized light generating device 1000 may receive the same input light through the first to fourth input optical waveguides IW1 to IW4 and may generate anti-angular polarized light, diagonal polarized light, right-circular polarized light, and left-circular polarized light. Alternatively, the polarized light generating device 1000 may receive the same input light through the first to fourth input optical waveguides IW1 to IW4 and may generate vertical polarized light, horizontal polarized light, right-circular polarized light, and left-circular polarized light.

The polarized light generating device 1000 based on the optical waveguide according to an embodiment of the present disclosure may be miniaturized and mass produced, by not using bulk optical components such as a polarization beam splitter, a beam splitter, and a wave plate, and separate devices that convert polarized light at a specific angle into polarized light at a random angle.

Figure 3:
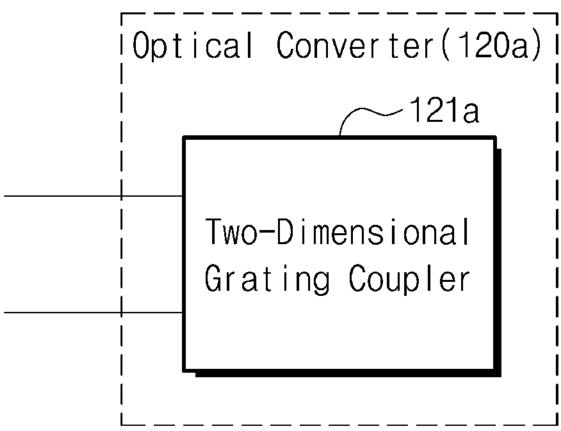
FIG. 3 illustrates an optical converter of FIG. 2 as an example.

FIG. 3 illustrates the optical converter 120 of FIG. 2 as an example. Referring to FIGS. 2 and 3, an optical converter 120*a* may be composed of a two-dimensional grating coupler 121*a*. The two-dimensional grating coupler 121*a* may receive at least one light output from the fifth optical splitter 115. The two-dimensional grating coupler 121*a* may output polarized light by converting a polarization plane (i.e., the plane where polarized light is defined) of at least one received light.

For example, the two-dimensional grating coupler 121*a* may receive at least one of first light and second light through different optical waveguides. In this case, the polarization planes of the first light and the second light may be the same to each other. In detail, the first light and the second light may be polarized lights defined on the same plane. When the two-dimensional grating coupler 121*a* receives one of the first light and the second light, the two-dimensional grating coupler 121*a* may output the polarized light by converting the polarization plane of the received light. When the two-dimensional grating coupler 121*a* receives both the first light and the second light, two-dimensional grating coupler 121*a* may combine the received first light and the second light and may convert the polarization plane to output the polarized light. In detail, the output polarized light may be polarized light defined on a plane different from the first light and the second light.

Figure 4:
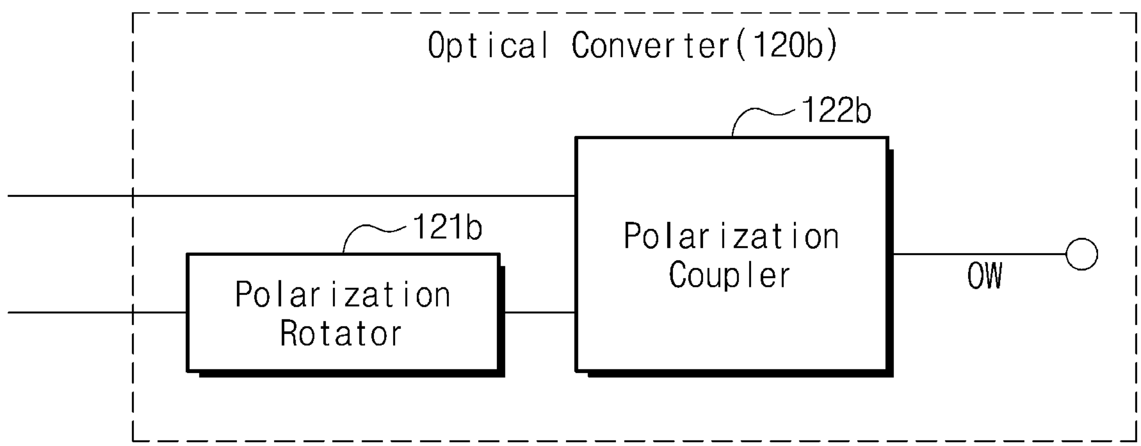
FIG. 4 illustrates an optical converter of FIG. 2 as an example.

FIG. 4 illustrates the optical converter 120 of FIG. 2 as an example. Referring to FIGS. 2 and 4, an optical converter 120*b* may be composed of a polarization rotator 121*b*, a polarization coupler 122*b* and an output optical waveguide OW.

The polarization rotator 121*b* may receive light through an optical waveguide connected to the fifth optical splitter 115. The polarization rotator 121*b* may rotate the polarization direction of the received light.

The polarization coupler 122*b* may receive light through at least one of an optical waveguide connected to the fifth optical splitter 115 and an optical waveguide connected to the polarization rotator 121*b*. When the polarization coupler 122*b* receives lights from two optical waveguides, the polarization coupler 122*b* may generate polarized light by combining the two received lights. The polarization plane of the generated polarized light may be the same as the polarization planes of the lights input to the optical converter 120*b*. In detail, the generated polarized light may be polarized light defined on the same plane as the lights input to the optical converter 120*b*.

Figure 5A:
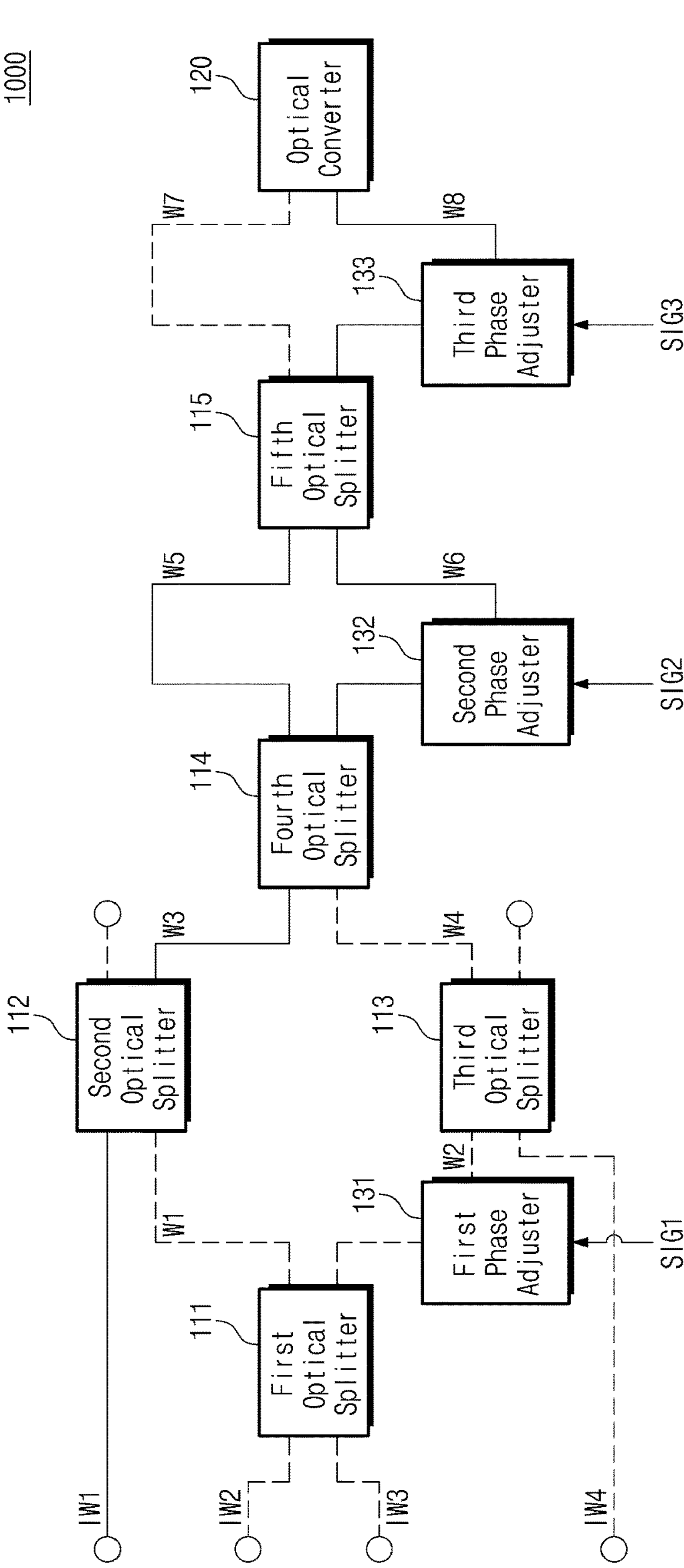
Figure 5C:
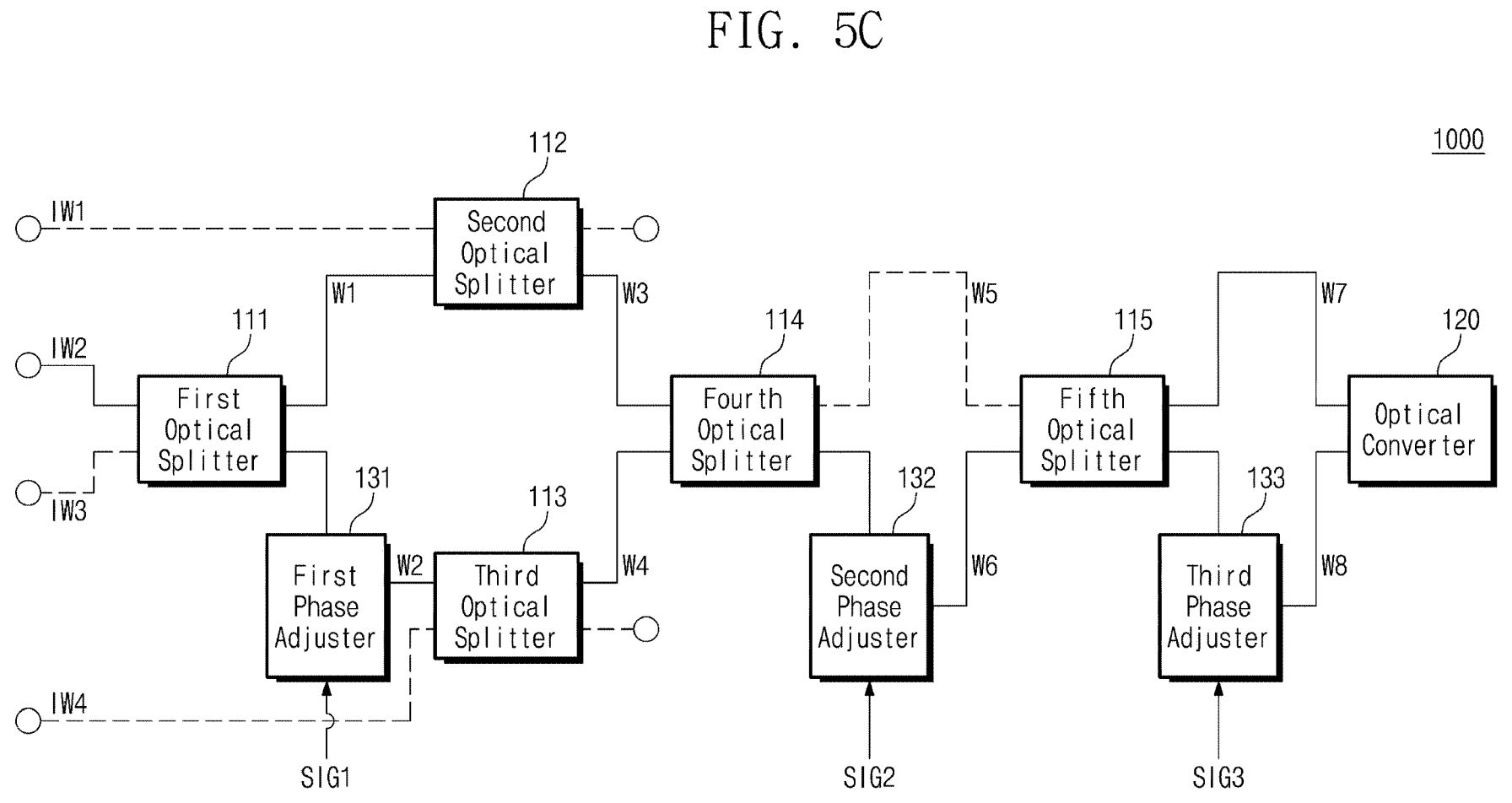

FIGS. 5A to 5D illustrate operations of the polarized light generating device 1000 of FIG. 2 as an example. FIG. 5A illustrates an operation of the polarized light generating device 1000 when input light travels through the first input optical waveguide IW1, FIG. 5B illustrates an operation of the polarized light generating device 1000 when input light travels through the fourth input optical waveguide IW4, FIG. 5C illustrates an operation of the polarized light generating device 1000 when input light travels through the second input optical waveguide IW2, and FIG. 5D illustrates an operation of the polarized light generating device 1000 when input light travels through the third input optical waveguide IW3.

Referring to FIGS. 2 and 5A, when the input light travels through the first input optical waveguide IW1, the second optical splitter 112 may receive the input light and may output the received input light to two optical waveguides including a third optical waveguide W3. The fourth optical splitter 114 may receive the light traveling through the third optical waveguide W3 from the second optical splitter 112. The fourth optical splitter 114 may output the received light to a fifth optical waveguide W5 and a sixth optical waveguide W6. The light traveling through the fifth optical waveguide W5 and the light traveling through the sixth optical waveguide W6 may have a phase difference of −90 degrees with respect to each other. The fifth optical splitter 115 may receive the light traveling through the fifth optical waveguide W5 and the light traveling through the sixth optical waveguide W6. The fifth optical splitter 115 may output the received lights to an eighth optical waveguide W8. The optical converter 120 may receive the light traveling through the eighth optical waveguide W8. The optical converter 120 may convert the received light and may output the first polarized light, which is anti-angular polarized light.

In this case, the second phase adjuster 132 may adjust the phase of light traveling through the sixth optical waveguide W6 to decrease the intensity of light traveling through the eighth optical waveguide W8. When the intensity of light traveling through the eighth optical waveguide W8 decreases, the light output from the fifth optical splitter 115 travels to the seventh optical waveguide W7, and the intensity of light traveling through the seventh optical waveguide W7 may increase as much as the intensity of light traveling through the eighth optical waveguide W8 decreases.

The third phase adjuster 133 may change the anti-angular polarized light output from the optical converter 120 into arbitrary polarized light by adjusting the phase of light traveling through the eighth optical waveguide W8. The arbitrary polarized light may be represented as a linear combination of the anti-angular polarized light and the diagonal polarized light. The intensity of each of the anti-angular polarized light and the diagonal polarized light may be arbitrarily determined based on the phase adjustment of the light traveling through the sixth optical waveguide W6 of the second phase adjuster 132. In detail, the second phase adjuster 132 may adjust the phase of light traveling through the sixth optical waveguide W6 such that the sum of the intensity of light traveling through the seventh optical waveguide W7 and the intensity of light traveling through the eighth optical waveguide W8 is the same as the sum of the intensities of anti-angular polarized light and diagonal polarized light. The phase difference between the anti-angular polarized light and the diagonal polarized light may be arbitrarily determined based on the phase adjustment of the light traveling through the eighth optical waveguide W8 of the third phase adjuster 133.

Referring to FIGS. 2 and 5B, when the input light travels through the fourth input optical waveguide IW4, the third optical splitter 113 may receive the input light and may output the received input light to two optical waveguides including a fourth optical waveguide W4. The fourth optical splitter 114 may receive the light traveling through the fourth optical waveguide W4 from the third optical splitter 113. The fourth optical splitter 114 may output the received light to the fifth optical waveguide W5 and the sixth optical waveguide W6. The light traveling through the fifth optical waveguide W5 and the light traveling through the sixth optical waveguide W6 may have a phase difference of 90 degrees with respect to each other. The fifth optical splitter 115 may receive the light traveling through the fifth optical waveguide W5 and the light traveling through the sixth optical waveguide W6. The fifth optical splitter 115 may output the received lights to a seventh optical waveguide W7. The optical converter 120 may receive the light traveling through the seventh optical waveguide W7. The optical converter 120 may convert the received light and may output the fourth polarized light, which is diagonal polarized light.

In this case, the second phase adjuster 132 may adjust the phase of light traveling through the sixth optical waveguide W6 to decrease the intensity of light traveling through the seventh optical waveguide W7. When the intensity of light traveling through the seventh optical waveguide W7 decreases, the light output from the fifth optical splitter 115 travels to the eighth optical waveguide W8, and the intensity of light traveling through the eighth optical waveguide W8 may increase as much as the intensity of light traveling through the seventh optical waveguide W7 decreases.

When the light travels through the eighth optical waveguide W8, the third phase adjuster 133 may adjust the phase of the light traveling through the eighth optical waveguide W8 to change the diagonal polarized light output from the optical converter 120 to an arbitrary polarized light. The arbitrary polarized light may be represented as a linear combination of the diagonal polarized light and the anti-angular polarized light. The intensity of each of the diagonal polarized light and the anti-angular polarized light may be arbitrarily determined based on the phase adjustment of the light traveling through the sixth optical waveguide W6 of the second phase adjuster 132. In detail, the second phase adjuster 132 may adjust the phase of light traveling through the sixth optical waveguide W6 such that the sum of the intensity of light traveling through the seventh optical waveguide W7 and the intensity of light traveling through the eighth optical waveguide W8 is the same as the sum of the intensities of the diagonal polarized light and the anti-angular polarized light. The phase difference between the diagonal polarized light and the anti-angular polarized light may be arbitrarily determined based on the phase adjustment of the light traveling through the eighth optical waveguide W8 of the third phase adjuster 133.

Referring to FIGS. 2 and 5C, when the input light travels through the second input optical waveguide IW2, the first optical splitter 111 may receive the input light and may output the received input light to the first and second optical waveguides W1 and W2. The light traveling through the first optical waveguide W1 and the light traveling through the second optical waveguide W2 may have a phase difference of 90 degrees with respect to each other.

The second optical splitter 112 may receive the light traveling through the first optical waveguide W1 and may output the received light to two optical waveguides including the third optical waveguide W3.

The third optical splitter 113 may receive the light traveling through the second optical waveguide W2 and may output the received light to two optical waveguides including the fourth optical waveguide W4.

The fourth optical splitter 114 may receive the light traveling through the third optical waveguide W3 and the light traveling through the fourth optical waveguide W4. The fourth optical splitter 114 may output the received lights to the sixth optical waveguide W6.

The fifth optical splitter 115 may receive the light traveling through the sixth optical waveguide W6. The fifth optical splitter 115 may output the received light to the seventh optical waveguide W7 and the eighth optical waveguide W8. The light traveling through the seventh optical waveguide W7 and the light traveling through the eighth optical waveguide W8 may have a phase difference of −90 degrees with respect to each other.

The optical converter 120 may receive the light traveling through the seventh optical waveguide W7 and the light traveling through the eighth optical waveguide W8. The optical converter 120 may convert the received lights and may output the second polarized light, which is right-circular polarized light.

In this case, the first phase adjuster 131 may change the polarized light output from the optical converter 120 into arbitrary polarized light by adjusting the phase of light traveling through the second optical waveguide W2. For example, the first phase adjuster 131 may rotate the right-circular polarized light output along a circle composed of right-circular polarized light, horizontal polarized light, left-circular polarized light, and vertical polarized light of the surface of the Poincare sphere, which represents the polarization state, by changing the phase of light traveling through the second optical waveguide W2.

The first phase adjuster 131 may adjust the phase of light traveling through the second optical waveguide W2 to decrease the intensity of light traveling through the sixth optical waveguide W6. When the intensity of light traveling through the sixth optical waveguide W6 decreases, the light output from the fourth optical splitter 114 travels to the fifth optical waveguide W5, and the intensity of light traveling through the fifth optical waveguide W5 may increase as much as the intensity of light traveling through the sixth optical waveguide W6 decreases.

The second phase adjuster 132 may adjust the phase of light traveling through the sixth optical waveguide W6 to decrease the intensity of light traveling through the seventh optical waveguide W7. When the intensity of light traveling through the seventh optical waveguide W7 decreases, the intensity of light traveling through the eighth optical waveguide W8 may increase as much as the intensity of light traveling through the seventh optical waveguide W7 decreases.

The third phase adjuster 133 may change the right-angular polarized light output from the optical converter 120 into arbitrary polarized light by adjusting the phase of light traveling through the eighth optical waveguide W8. The arbitrary polarized light may be represented as a linear combination of the anti-angular polarized light and the diagonal polarized light. The intensity of each of the anti-angular polarized light and the diagonal polarized light may be arbitrarily determined based on the phase adjustment of the light traveling through the sixth optical waveguide W6 of the second phase adjuster 132. In detail, the second phase adjuster 132 may adjust the phase of light traveling through the sixth optical waveguide W6 such that the sum of the intensity of light traveling through the seventh optical waveguide W7 and the intensity of light traveling through the eighth optical waveguide W8 is the same as the sum of the intensities of anti-angular polarized light and diagonal polarized light. The phase difference between the anti-angular polarized light and the diagonal polarized light may be arbitrarily determined based on the phase adjustment of the light traveling through the eighth optical waveguide W8 of the third phase adjuster 133.

Referring to FIGS. 2 and 5D, when the input light travels through the third input optical waveguide IW3, the first optical splitter 111 may receive the input light and may output the received input light to the first and second optical waveguides W1 and W2. The light traveling through the first optical waveguide W1 and the light traveling through the second optical waveguide W2 may have a phase difference of −90 degrees with respect to each other.

The second optical splitter 112 may receive the light traveling through the first optical waveguide W1 and may output the received light to two optical waveguides including the third optical waveguide W3.

The third optical splitter 113 may receive the light traveling through the second optical waveguide W2 and may output the received light to two optical waveguides including the fourth optical waveguide W4.

The fourth optical splitter 114 may receive the light traveling through the third optical waveguide W3 and the light traveling through the fourth optical waveguide W4.

The fourth optical splitter 114 may output the received lights to the fifth optical waveguide W5.

The fifth optical splitter 115 may receive the light traveling through the fifth optical waveguide W5. The fifth optical splitter 115 may output the received light to the seventh optical waveguide W7 and the eighth optical waveguide W8. The light traveling through the seventh optical waveguide W7 and the light traveling through the eighth optical waveguide W8 may have a phase difference of 90 degrees with respect to each other.

The optical converter 120 may receive the light traveling through the seventh optical waveguide W7 and the light traveling through the eighth optical waveguide W8. The optical converter 120 may convert the received light and may output third polarized light, which is left-circular polarized light.

In this case, the first phase adjuster 131 may change the polarized light output from the optical converter 120 by adjusting the phase of light traveling through the second optical waveguide W2. For example, the first phase adjuster 131 may rotate the left-circular polarized light output along a circle composed of right-circular polarized light, horizontal polarized light, left-circular polarized light, and vertical polarized light of the surface of the Poincare sphere, which represents the polarization state, by changing the phase of light traveling through the second optical waveguide W2.

The first phase adjuster 131 may adjust the phase of light traveling through the second optical waveguide W2 to decrease the intensity of light traveling through the fifth optical waveguide W5. When the intensity of light traveling through the fifth optical waveguide W5 decreases, the light output from the fourth optical splitter travels to the sixth optical waveguide W6, and the intensity of light traveling through the sixth optical waveguide W6 may increase as much as the intensity of light traveling through the fifth optical waveguide W5 decreases.

When the light travels through the sixth optical waveguide W6, the second phase adjuster 132 may adjust the phase of the light traveling through the sixth optical waveguide W6 to decrease the intensity of light traveling through the seventh optical waveguide W7. When the intensity of light traveling through the seventh optical waveguide W7 decreases, the intensity of light traveling through the eighth optical waveguide W8 may increase as much as the intensity of light traveling through the seventh optical waveguide W7 decreases.

The third phase adjuster 133 may change the left-angular polarized light output from the optical converter 120 into arbitrary polarized light by adjusting the phase of light traveling through the eighth optical waveguide W8. The arbitrary polarized light may be represented as a linear combination of the anti-angular polarized light and the diagonal polarized light. The intensity of each of the anti-angular polarized light and the diagonal polarized light may be arbitrarily determined based on the phase adjustment of the light traveling through the sixth optical waveguide W6 of the second phase adjuster 132. In detail, the second phase adjuster 132 may adjust the phase of light traveling through the sixth optical waveguide W6 such that the sum of the intensity of light traveling through the seventh optical waveguide W7 and the intensity of light traveling through the eighth optical waveguide W8 is the same as the sum of the intensities of anti-angular polarized light and diagonal polarized light. The phase difference between the anti-angular polarized light and the diagonal polarized light may be arbitrarily determined based on the phase adjustment of the third phase controller 133.

In FIGS. 5A to 5D, each of the second phase adjuster 132 and the third phase adjuster 133 may adjust the phase of light such that the first polarized light and the fourth polarized light are perpendicular to each other, and the second polarized light and the third polarized light are perpendicular to each other. The first polarized light and the fourth polarized light may be perpendicular to each other regardless of phase adjustment of the first phase adjuster 131, and the second polarized light and the third polarized light may be perpendicular to each other regardless of phase adjustment of the first phase adjuster 131.

For example, when the light received through the first input optical waveguide IW1 is horizontal polarized light, the first polarized light output from the optical converter 120 may be vertical polarized light. When the light received through the fourth input optical waveguide IW4 is horizontal polarized light, the fourth polarized light output from the optical converter 120 may be horizontal polarized light. When the light received through the second input optical waveguide IW2 is horizontal polarized light, the second polarized light output from the optical converter 120 may be left-circular polarized light. When the light received through the third input optical waveguide IW3 is horizontal polarized light, the third polarized light output from the optical converter 120 may be left-circular polarized light.

Figure 6:
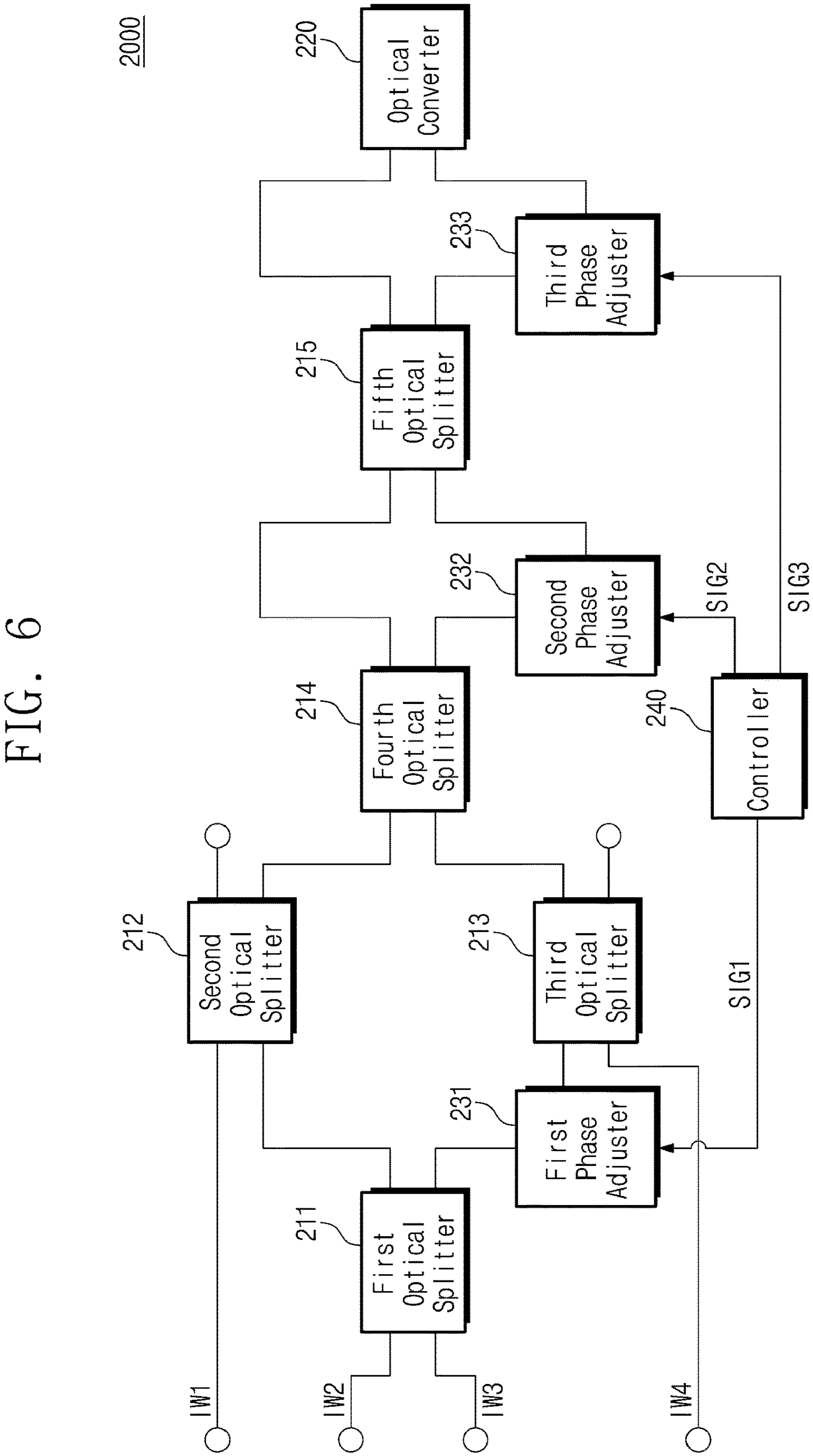
FIG. 6 illustrates a polarized light generating device according to an embodiment of the present disclosure.

FIG. 6 illustrates a polarized light generating device 2000 according to an embodiment of the present disclosure. Referring to FIG. 6, the polarized light generating device 2000 may include the first to fourth input optical waveguides IW1 to IW4, first to fifth optical splitters 211 to 215, a two-dimensional grating coupler 220, first to third phase adjusters 231 to 233, and a controller 240.

Except that the polarized light generating device 2000 includes the controller 240, the polarized light generating device 2000 has the same structure and performs the same operation as the polarized light generating device 1000 of FIG. 2. Therefore, additional descriptions will be omitted to avoid redundancy.

The polarized light generating device 2000 may include the controller 240 that generates a plurality of control signals. The controller 240 may control the first to third phase adjusters 331 to 333 to adjust the phase of light based on the plurality of control signals. For example, the controller 240 may generate the first control signal SIG1. The first phase adjuster 231 may adjust the phase of light based on the first control signal SIG1 received from the controller 240. The controller 240 may generate the second control signal SIG2. The second phase adjuster 232 may adjust the phase of light based on the second control signal SIG2 received from the controller 240. The controller 240 may generate the third control signal SIG3. The third phase adjuster 233 may adjust the phase of light based on the third control signal SIG3 received from the controller 240.

FIG. 7 illustrates a polarized light splitting device 3000 according to an embodiment of the present disclosure. Referring to FIGS. 2 and 7, the polarized light splitting device 3000 has the same structure as the polarized light generating device 1000 of FIG. 2, except that the first to fourth input optical waveguides IW1 to IW4 of FIG. 2 become first to fourth output optical waveguides OW1 to OW4 of FIG. 7. Therefore, additional descriptions will be omitted to avoid redundancy.

The polarized light splitting device 3000 may include the first to fourth output optical waveguides OW1 to OW4, first to fifth optical splitters 311 to 315, an optical converter 320, and first to third phase adjusters 331 to 333. The first to fifth optical splitters 311 to 315, the optical converter 320, and the first to third phase adjusters 331 to 333 may be connected to each other through optical waveguides.

Each of the first to fifth optical splitters 311 to 315 may receive at least one light and may output the received light as at least one light.

For example, the first optical splitter 311 may receive the light through at least one of the optical waveguide connected to the optical converter 320 and the optical waveguide connected to the first phase adjuster 331, and may output the received light through at least one of two different optical waveguides. The second optical splitter 312 may receive the light through at least one of the optical waveguide connected to the first optical splitter 311 and the optical waveguide connected to the second phase adjuster 332, and may output the received light through at least one of two different optical waveguides. The third optical splitter 313 may receive one light from the second optical splitter 312 through an optical waveguide, and may output the received light to at least one of the optical waveguides connected to the first output optical waveguide OW1 and the fifth optical splitter 315. The fourth optical splitter 314 may receive the light from the second optical splitter 312 through an optical waveguide, and may output the received light to at least one of the optical waveguides connected to the fourth output optical waveguide OW4 and the third phase adjuster 333. The fifth optical splitter 315 may receive the light through at least one of the optical waveguide connected to the third optical splitter 313 and the optical waveguide connected to the third phase adjuster 333, and may output the received light to at least one of the optical waveguides output through at least one of the second and third output optical waveguides OW2 and OW3.

When the fifth optical splitter 315 receives one light, the fifth optical splitter 315 may output lights through both the second and third output optical waveguides OW2 and OW3. When the fifth optical splitter 315 receives two lights, the fifth optical splitter 315 may output the light through one of the second and third output optical waveguides OW2 and OW3.

The polarized light splitting device 3000 may include the optical converter 320. The optical converter 320 may receive at least one polarized light and may convert the received polarized light into at least one light. In this case, the optical converter 320 may receive polarized light belonging to elements of two arbitrary two-dimensional mutually unbiased basis sets.

The polarized light splitting device 3000 may include the first to third phase adjusters 331 to 333. The first phase adjuster 331 may be connected to the optical converter 320 and the first optical splitter 311 through an optical waveguide, the second phase adjuster 332 may be connected to the first optical splitter 311 and the second optical splitter 312 through an optical waveguide, and the third phase adjuster 333 may be connected to the fourth optical splitter 314 and the fifth optical splitter 315 through an optical waveguide. The first phase adjuster 331 may adjust the phase of light output from the optical converter 320 based on the first control signal SIG1 received from the outside. The second phase adjuster 112 may adjust the phase of light output from the first optical splitter 311 based on the second control signal SIG2 received from the outside. The third phase adjuster 333 may adjust the phase of light output from the fourth optical splitter 314 based on the third control signal SIG3 received from the outside.

The polarized light splitting device 3000 may output separate lights. The polarized light input to the polarized light splitting device 3000 may be inferred from the output lights. For example, when anti-angular polarized light is input to the polarized light splitting device 3000, the first output optical waveguide OW1, the second output optical waveguide OW2, and the third output optical waveguide OW3 may output the lights at a ratio of 50:25:25. In detail, the polarized light input to the polarized light splitting device 3000 may be inferred through the ratio of lights output to the first to fourth output optical waveguides OW1 to OW4.

Figure 8:
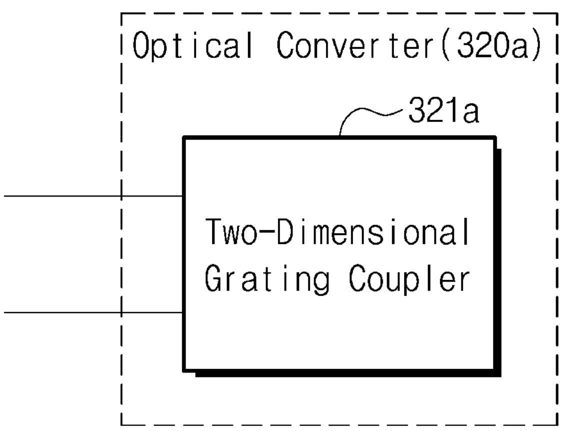
FIG. 8 illustrates an optical converter of FIG. 7 as an example.

FIG. 8 illustrates the optical converter 320 of FIG. 7 as an example. Referring to FIGS. 7 and 8, an optical converter 320*a* may be composed of a two-dimensional grating coupler 321*a*. The two-dimensional grating coupler 321*a* may receive input polarized light. The two-dimensional grating coupler 321*a* may convert the polarization plane (i.e., the plane where polarized light is defined) of the received input polarized light and may output the converted polarized light through at least one of two different optical waveguides.

Figure 9:
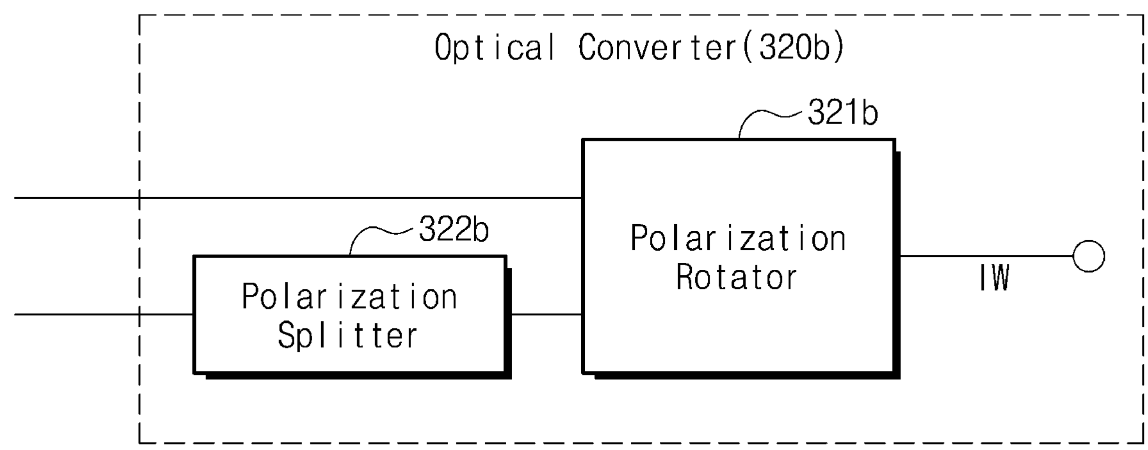
FIG. 9 illustrates an optical converter of FIG. 7 as an example.

FIG. 9 illustrates the optical converter 320 of FIG. 7 as an example. Referring to FIGS. 4 and 9, an optical converter 320*b* has the same structure as the optical converter 120*b* of FIG. 4, except that the output optical waveguide OW of the optical converter 120*b* of FIG. 4 become an input optical waveguide IW of the optical converter 320*b* of FIG. 9. Therefore, additional descriptions will be omitted to avoid redundancy.

Referring to FIGS. 7 and 9, the optical converter 320*b* may be composed of a polarization splitter 321*b*, a polarization rotator 322*b* and a input optical waveguide IW.

The polarization splitter 321*b* may receive input polarized light through the input optical waveguide IW. The polarization splitter 321*b* may output the received input polarized light to at least one of two different optical waveguides. In this case, one of the two different optical waveguides may be connected to the polarization rotator 322*b*.

The polarization rotator 322*b* may receive the light through an optical waveguide connected to the polarization splitter 321*b*. The polarization rotator 322*b* may rotate the polarization direction of the received light.

In the above embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

According to an embodiment of the present disclosure, since the device for generating and splitting a polarized light may be manufactured in the form of waveguides, mass production of polarized light generating devices or polarized light splitting devices may be achieved, as well as miniaturization and integration of devices.

According to an embodiment of the present disclosure, the device for generating and splitting the polarized light may generate and split arbitrary polarized lights, thereby overcoming polarization distortion that may occur in actual use. Additionally, users may select the four polarized lights needed for actual use.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments and should be defined by not only the claims to be described later, but also those equivalent to the claims of the present disclosure.

What is claimed is:

1. A polarized light generating device based on an optical waveguide comprising:
first to fourth input optical waveguides, respectively, for receiving input light from an outside;
first to fifth optical splitters configured to receive at least one light and output the received at least one light as at least one light; and
an optical converter configured to receive at least one light from the fifth optical splitter and convert the received light to generate polarized light,
wherein the input light through one of the first to fourth input optical waveguides is received,
wherein, when the input light is received through the first input optical waveguide, a first polarized light is generated, when the input light is received through the second input optical waveguide, a second polarized light is generated, when the input light is received through the third input optical waveguide, a third polarized light is generated, and when the input light is received through the fourth input optical waveguide, a fourth polarized light is generated,
wherein the first to fourth polarized lights belong to elements of two arbitrary two-dimensional mutually unbiased basis sets, and
wherein the first optical splitter receives the light from at least one of the second input optical waveguide and the third input optical waveguide,
the second optical splitter receives the light from at least one of the first input optical waveguide and the first optical splitter,
the third optical splitter receives the light from at least one of the fourth input optical waveguide and the first optical splitter,
the fourth optical splitter receives light from at least one of the second optical splitter and the third optical splitter, and
the fifth optical splitter receives the light from the fourth optical splitter through at least one of two different optical waveguides.

2. The polarized light generating device of claim 1, wherein the first polarized light is perpendicular to the fourth polarized light, and
wherein the second polarized light is perpendicular to the third polarized light.

3. The polarized light generating device of claim 2, wherein the first to fourth polarized lights are four different points on a surface of a Poincare sphere representing a polarized light state.

4. The polarized light generating device of claim 3, wherein the first to fourth polarized lights exist on a plane passing through an origin of the Poincare sphere.

5. The polarized light generating device of claim 4, wherein the first to fourth polarized lights are spaced apart from each other at equal intervals on the surface of the Poincare sphere.

6. The polarized light generating device of claim 1, wherein the polarized light generating device includes:
a first phase adjuster configured to adjust a phase of the light received from the first optical splitter to output the light to the third optical splitter;
a second phase adjuster configured to adjust a phase of the light received from the fourth optical splitter to output the light to the fifth optical splitter; and
a third phase adjuster configured to adjust a phase of the light received from the fifth optical splitter to output the light to the optical converter.

7. The polarized light generating device of claim 6, wherein the optical converter is composed of a two-dimensional grating coupler, and
wherein the two-dimensional grating coupler converts a polarization plane of at least one light received from the fifth optical splitter to output the polarized light.

8. The polarized light generating device of claim 7, wherein the two-dimensional grating coupler receives at least one of first light and second light through two different optical waveguides, and
wherein polarization planes of the first light and the second light are the same.

9. The polarized light generating device of claim 6, wherein the optical converter includes a polarization rotator and a polarization coupler,
wherein the polarization rotator rotates a polarization direction of the light received from the fifth optical splitter to output the light to the polarization coupler, and
wherein the polarization coupler combines at least one light received from the fifth optical splitter and the polarization rotator to output the polarized light through an output optical waveguide.

10. The polarized light generating device of claim 9, wherein the polarization coupler receives at least one of first light and second light through the fifth optical splitter and the polarization rotator and
wherein polarization planes of the first light, the second light, and the generated polarized light are the same.

11. The polarized light generating device of claim 6, further comprising:
a controller configured to output a first control signal to control the first phase adjuster, to output a second control signal to control the second phase adjuster, and to output a third control signal to control the third phase adjuster.

12. A polarized light splitting device based on an optical waveguide comprising:
an optical converter configured to receive a polarized light from an outside and convert the polarized light to output at least one light;
first to fifth optical splitters configured to receive at least one light and output the received at least one light as at least one light; and
first to fourth output optical waveguides for outputting output light, respectively, and
wherein the at least one output light is output through at least one of the first to fourth output optical waveguides,
wherein the polarized light is one of elements of two arbitrary two-dimensional mutually unbiased basis sets, and
wherein the first optical splitter receives at least one light output from the optical converter,
the second optical splitter receives at least one light from the first optical splitter,
the third optical splitter receives the light from the second optical splitter and outputs the received light to at least one of the first output optical waveguide and the fifth optical splitter,
the fourth optical splitter receives the light from the second optical splitter and outputs the received light to at least one of the fourth output optical waveguide and the fifth optical splitter, and the fifth optical splitter receives the at least one light from the third optical splitter and the fourth optical splitter, and outputs the received light to at least one of the second output optical waveguide and the third output optical waveguide.

13. The polarized light splitting device of claim 12, wherein the polarized light splitting device includes:

a first phase adjuster configured to adjust a phase of the light received from the optical converter to output the light to the first optical splitter;

a second phase adjuster configured to adjust a phase of the light received from the first optical splitter to output the light to the second optical splitter; and a third phase adjuster configured to adjust a phase of the light received from the fourth optical splitter to output the light to the fifth optical splitter.

14. The polarized light splitting device of claim 13, wherein the optical converter is composed of a two-dimensional grating coupler, and wherein the two-dimensional grating coupler converts a polarization plane of the polarized light to output at least one light.

15. The polarized light splitting device of claim 14, wherein the two-dimensional grating coupler outputs at least one of first light and second light through two different optical waveguides, and wherein polarization planes of the first light and the second light are the same.

16. The polarized light splitting device of claim 13, wherein the optical converter includes a polarization splitter and a polarization rotator, wherein the polarization splitter outputs the polarized light received from the outside through an input optical waveguide as at least one light, and wherein the polarization rotator rotates a polarization direction of the light output from the polarization splitter.

17. The polarized light splitting device of claim 16, wherein the polarization splitter outputs the polarized light received through the input optical waveguide as at least one of first light and second light through two different optical waveguides, and wherein polarization planes of the polarized light, the first light, and the second light are the same.

* * * * *